United States Patent
Matsui

(10) Patent No.: US 7,870,726 B2
(45) Date of Patent: Jan. 18, 2011

(54) LOCAL BACKUP HYDRAULIC ACTUATOR FOR AIRCRAFT CONTROL SYSTEMS

(75) Inventor: Gen Matsui, Bothell, WA (US)

(73) Assignee: Nabtesco Corporation, Tokyo (JP)

( * ) Notice: Subject to any disclaimer, the term of this patent is extended or adjusted under 35 U.S.C. 154(b) by 0 days.

(21) Appl. No.: 12/502,958

(22) Filed: Jul. 14, 2009

(65) Prior Publication Data

US 2009/0272110 A1    Nov. 5, 2009

Related U.S. Application Data

(62) Division of application No. 11/108,036, filed on Apr. 14, 2005, now Pat. No. 7,600,715.

(60) Provisional application No. 60/665,545, filed on Mar. 25, 2005.

(51) Int. Cl.
 *F16D 31/02* (2006.01)
(52) U.S. Cl. ...................................... 60/405
(58) Field of Classification Search .................. 60/405, 60/430

See application file for complete search history.

(56) References Cited

U.S. PATENT DOCUMENTS

| | | | | |
|---|---|---|---|---|
| 3,940,931 | A | 3/1976 | Renfro et al. ................. 60/403 |
| 4,304,103 | A * | 12/1981 | Hamrick et al. ............... 60/405 |
| 4,345,191 | A | 8/1982 | Takats et al. ................. 318/564 |
| 4,345,660 | A * | 8/1982 | Miller ........................... 60/405 |
| 4,472,780 | A | 9/1984 | Chenoweth et al. ......... 364/434 |
| 4,754,940 | A | 7/1988 | Deter ........................ 244/75 R |
| 5,074,495 | A | 12/1991 | Raymond .................... 244/78 |
| 5,100,082 | A | 3/1992 | Archung ....................... 244/78 |
| 5,109,672 | A | 5/1992 | Chenoweth et al. ........... 60/456 |
| 5,181,380 | A | 1/1993 | Favre et al. .................... 60/405 |
| 5,274,554 | A | 12/1993 | Takats et al. ............ 364/424.03 |
| 5,335,926 | A | 8/1994 | Stolle .......................... 280/117 |
| 5,493,497 | A | 2/1996 | Buus .......................... 364/434 |
| 5,797,564 | A | 8/1998 | Cartmell et al. ............. 244/223 |
| 5,868,359 | A | 2/1999 | Cartmell et al. ............. 244/223 |
| 5,937,646 | A | 8/1999 | Zakula ......................... 60/430 |
| 6,206,329 | B1 | 3/2001 | Gautier et al. .............. 244/221 |
| 6,625,982 | B2 | 9/2003 | Van Den Bossche et al. .. 60/403 |
| 6,685,138 | B1 | 2/2004 | Krantz ......................... 244/78 |
| 6,799,739 | B1 | 10/2004 | Jones .......................... 244/10 |
| 6,923,405 | B2 | 8/2005 | Cline et al. ................ 244/75 R |
| 7,175,133 | B2 | 2/2007 | Tanaka et al. .............. 244/99.4 |
| 7,191,593 | B1 | 3/2007 | Ho .............................. 60/403 |
| 2002/0121087 | A1 | 9/2002 | Van Den Bossche et al. .. 60/476 |
| 2004/0195909 | A1 | 10/2004 | Hamzeh et al. ............... 303/10 |

FOREIGN PATENT DOCUMENTS

DE    196 54 781 A1    7/1998

\* cited by examiner

*Primary Examiner*—Michael Leslie
(74) *Attorney, Agent, or Firm*—Seed IP Law Group PLLC

(57) ABSTRACT

A backup system is provided that has a local electric motor and pump for some or all of hydraulic actuators. A local backup hydraulic actuator has two power sources, hydraulic as primary and electrical as backup. During normal operation, the hydraulic actuator receives pressurized fluid from a hydraulic system and the fluid flow to the chambers is controlled by a servo valve. If the hydraulic system fails, the electronic controller detects the failure by observing the signal indicative of the pressure from the pressure sensor, and the controller powers the local hydraulic pump to provide high pressure hydraulic fluid to the hydraulic actuator via the servo valve.

20 Claims, 8 Drawing Sheets

LOCAL BACKUP HYDRAULIC ACTUATOR FOR AIRCRAFT CONTROL SYSTEMS

CROSS-REFERENCE TO RELATED APPLICATIONS

This is a divisional application of U.S. nonprovisional patent application Ser. No. 11/108,036, filed Apr. 14, 2005, currently pending, which claims benefit under 35 U.S.C. §119(e) of U.S. Provisional Patent Application Ser. No. 60/665,545, filed Mar. 25, 2005, each of which are incorporated herein by reference, in their entireties.

BACKGROUND OF THE INVENTION

This invention relates to aircraft flight control system and hydraulic system and, more particularly, to a method and apparatus for maintaining control of the aircraft if the primary hydraulic system is compromised.

DESCRIPTION OF THE RELATED ART

Flight control systems in commercial aircraft have redundancy to permit control of the aircraft in the event of failure of part of the system. For the hydraulic actuators that control the flight control surfaces, backup systems are present on each aircraft so that if one of the hydraulic systems fails, other systems are available to provide power to control sufficient flight control surfaces.

A commercial aircraft typically has a plurality of independent central hydraulic systems, usually two or three, depending on the type of aircraft. The hydraulic pressure in each central hydraulic system is generated by one or more centrally located hydraulic pumps which are driven directly or indirectly by a main power source such as an engine. Each central hydraulic system has a plurality of aircraft systems which draw hydraulic power from it to actuate components in the airplane, and the flight control system is one such system. High pressured hydraulic fluid in each central hydraulic system is carried in hydraulic lines to the hydraulic actuators at each flight control surface. Servo valve at each hydraulic actuator controls the application of pressurized fluid to the hydraulic actuators. The servo valves operate based on electrical signals transmitted on electric wires throughout the aircraft, thus providing a fly-by-wire control system.

Among the methods to provide redundancy of power is to have the flight control of hydraulic actuators powered by different independent hydraulic systems. In addition, on a flight control surface whose continued operation is critical, there may be multiple actuators, each drawing power from a different hydraulic system. The locations of the hydraulic actuators that receive pressure from each central hydraulic system are selected such that sufficient flight control surfaces are available to support continued safe flight and landing following the failure of any two hydraulic systems.

Because each central hydraulic system consists of large pumps and tubing that extends through the entire aircraft to each flight control surface, there are significant economical and performance advantages to being able to reduce the number of required systems, especially with large aircraft. At the same time, an equivalent or better level of safety must be assured for the aircraft. In order to realize this, two types of actuators, EHA and EBHA, have been proposed in the prior art.

An Electro-hydrostatic actuator (EHA) is an electric actuator which uses the central electrical system to power the motor which is connected to a two-way pump, both of which are typically mounted on the actuator. A hydraulic reservoir and lines are provided at each actuator, and therefore, it requires no connection to a central hydraulic system. During normal operation, the outports of the two-way pump are connected directly to the actuator such that the movement of the pump translates directly to the extension and retraction movements of the piston/rod assembly. The control signals for the motor and pump are carried on control wires that go throughout the aircraft. By replacing all of the hydraulic actuators on a particular hydraulic system with EHAs and routing electrical power cables to each, it becomes possible to eliminate that hydraulic system.

There are two major disadvantages associated with EHAs and the system comprising them. One is the reduced reliability of each local hydraulic system comprising a motor, motor driver, and motor driver electronics. They are subject to being overworked and are more likely to fail than a central hydraulic system or hydraulic actuator or such a central system. Since they are required at each actuator, failure of one of these components will result in failure of the EHA.

The second problem is force fight, which will now be explained in more detail. In order to reduce the number of required hydraulic systems, some of the conventional hydraulic actuators may be replaced with EHAs. In many cases, it is desirable to replace one of the actuators on a particular surface, while leaving the other one hydraulic. When multiple actuators on a particular surface are operating simultaneously, it is called an active-active system, or the actuators are referred to as working in an active-active fashion. In an active-active system, even minor differences in the timing of operation of the valves, pumps, and pressure in each system creates a force fight. When dissimilar actuators, such as EHA and conventional hydraulic actuator, are used on a surface in an active-active fashion, blending them to work in perfect unison is very difficult, and so, a force fight is very likely to occur in this situation. If there is a substantial force fight, the electric motor, pump, actuator components, or surrounding structure may be overloaded and subject to premature failure.

In order to overcome the difficulties associate with reduced reliability and force fight, one current solution is to operate only one actuator on a surface at a time, keeping the EHA on standby until the hydraulic actuator on the same surface fails. Once the hydraulic actuator fails, the electric motor and pump in the EHA are activated to maintain control of the surface. This is called an active-standby system since one actuator is on standby and is not active until the other actuator fails. This circumvents the reliability issue of the EHA because the EHA is used only after failure. It also avoids force fight by activating only one actuator on any surface at once. While an active-standby system offers some solutions to these difficulties, there are many other advantages to an active-active system that make it more attractive.

An electric backup hydraulic actuator (EBHA) is a hybrid actuator employing both electric and hydraulic powers, and it is another prior art system that may be used to allow reduction in the central hydraulic system. It is a combination of an EHA and conventional hydraulic actuator, and it has connections to both the central hydraulic system and the electrical system. In an EBHA, the primary source of power is provided by hydraulic fluids lines of a particular hydraulic system, as is standard. In addition, EBHA also has a local electric motor and two-way pump, and in the event of failure of the central hydraulic system, the local electric motor and pump are switched on by electric signals on the distributed control line to power and control the actuator in the same way as an EHA. Although it requires connection to the hydraulic system, because it remains functional following the complete failure of the hydraulic system, by connecting EBHAs to appropriate flight control surfaces, continued safe flight and landing is possible following a complete loss of the central hydraulic systems, which might occur if there are only two hydraulic systems.

EBHA overcomes the reduced reliability problem of EHAs by using the low-reliability components only as backup and activating them only following the failure of the primary power or control components. On the other hand, the force fight problem between dissimilar actuators on a particular surface used in an active-active fashion still remains. If one EBHA and one hydraulic actuator is coupled to a surface, for example, the EBHA functions as a hydraulic actuator during normal operation, because the electric motor is turned off, and so, there is no increase in the level of force fight as compared to having two hydraulic actuators. Following the failure of the primary hydraulic source, however, the EBHA behaves as an EHA, and so, it is subject to the same aforementioned force fight issue associated with having an EHA and a hydraulic actuator on the same surface and having them work in an active-active fashion. In addition, coupling only EBHAs to a surface and having them work in an active-active fashion would also result in the same situation when one of the primary hydraulic power sources fails.

Some systems of the prior art are shown in U.S. Pat. Nos. 5,181,380, 6,625,982, 4,472,780 and 5,493,497.

Thus, each of the systems comprising EHAs or EBHAs, while offering some potential advantages over the conventional flight control systems comprising all hydraulic actuators, have significant difficulties being applied particularly to active-active systems, which in itself has advantages over active-standby systems. An improved system and actuator would provide significant advantages for aircraft operation, especially if it resulted in reduced overall cost and weight at the same time as providing increased reliability and increased safety.

BRIEF SUMMARY OF THE INVENTION

According to principles of the present invention, a backup system is provided that has a local electric motor and pump for some or all of the hydraulic actuators. A local backup hydraulic actuator (LBHA) has two power sources, central hydraulic as primary and electrical as backup. During normal operation, the hydraulic actuator receives pressurized fluid from one of the central hydraulic systems and the fluid flow to the chambers is controlled by a servo valve. Failure of the hydraulic system is detected by the local electronic controller that monitors the output signal of a pressure sensor. When this observed pressure falls below a certain threshold, the local electronic controller determines that this central hydraulic system has failed and turns on the electrical motor, which powers the local hydraulic pump to provide high pressure hydraulic fluid to the hydraulic actuator via the servo valve. The local electronic controller also uses the pressure reading for closed-loop feedback control, and the pressure is maintained at the normal level. Other types of monitoring and control schemes may also be used instead. In this manner, the LBHA remains functional with electrical power following a partial or complete failure of the central hydraulic system.

By coupling the LBHAs to appropriate flight control surfaces, the airplane remains controllable with loss of all central hydraulic systems; therefore, the number of central hydraulic systems can be reduced compared to using only conventional hydraulic actuators.

As explained in the background of the invention, some prior art approaches provide a reduction in the number of hydraulic systems, namely EHA and EBHA, for example. A major advantage that the LBHA offers over these prior art actuators is that it enables this reduction in the central hydraulic system for airplanes with flight control surfaces which are controlled in an active-active fashion. This is accomplished by overcoming both of the two major difficulties that have been cited herein for the electric and hybrid actuators of the prior art, namely that of reduced reliability and force fight.

The LBHA overcomes the reduced reliability problem by using the low-reliability components only as backup following the failure of a central hydraulic system or during specific phases of flight. The electrical part of the LBHA can be switched off during much of flight so the life of the motor and pump is greatly extended. Therefore, even when the LBHA is used continuously during normal operation, such as on an active-active surface, the operation is more reliable and the life of the motor and pump are extended.

The force fight problem associated with coupling dissimilar actuators on a surface and using them in an active-active fashion is resolved according to this invention by continuously controlling the actuator in the same manner as a conventional hydraulic actuator and providing as backup only an alternate power source. The local motor and pump are upstream of the servo valve and in parallel with the central hydraulic lines. A common servo valve for the hydraulic actuator is used under a unified electrical control system for both the central hydraulic system and the backup system. This ensures that there is no substantial force fight when LBHA is used in an active-active fashion with a hydraulic actuator or another LBHA on the same surface. This is because during normal operation and operation following the failure of the central hydraulic system, the LBHA is controlled in the same manner through the servo valve, with the only difference being the source of hydraulic power, central or local.

In addition to enabling the reduction of hydraulic systems and resolving the problems associated with applying electric or hybrid actuators of prior art in an active-active fashion, the LBHA also offers other advantages. With the LBHA, the local pump can be a one-way pump rather than a two-way pump, which, together with the motor and controller, is lower in weight and cost, while having higher reliability. The local pump's role is to provide increased local pressure, rather than also provide servo control of the system, thus simplifying the motor, the motor driver, and control device, and increasing the reliability of operation.

The inventive system also provides the advantage that during critical flight phases, such as takeoff and landing, both the main system and the backup system can be in operation. In the event of failure of the main system, the backup system is already under power and is assisting in the operation, so that there is no time lost for control while the backup system comes on. Check valves are provided between the central hydraulic system and the local backup system, permitting both to operate at the same time when appropriate.

A further advantage is that the backup system has a separate power source, namely electric power, so that increased availability of power is provided to the actuator. Because of this, providing one LBHA in conjunction with at least one hydraulic actuator for a particular surface is able to ensure that the likelihood of a complete loss of the power to position the surface correctly is negligible. This may, for example, enable reduction in the number of actuators coupled to a surface compared to only using conventional hydraulic actuators, while achieving an equivalent or better level of safety. This may also enable smaller, lighter, and simpler individual actuators than otherwise would have been possible.

DETAILED DESCRIPTION OF THE INVENTION

Figure 1:
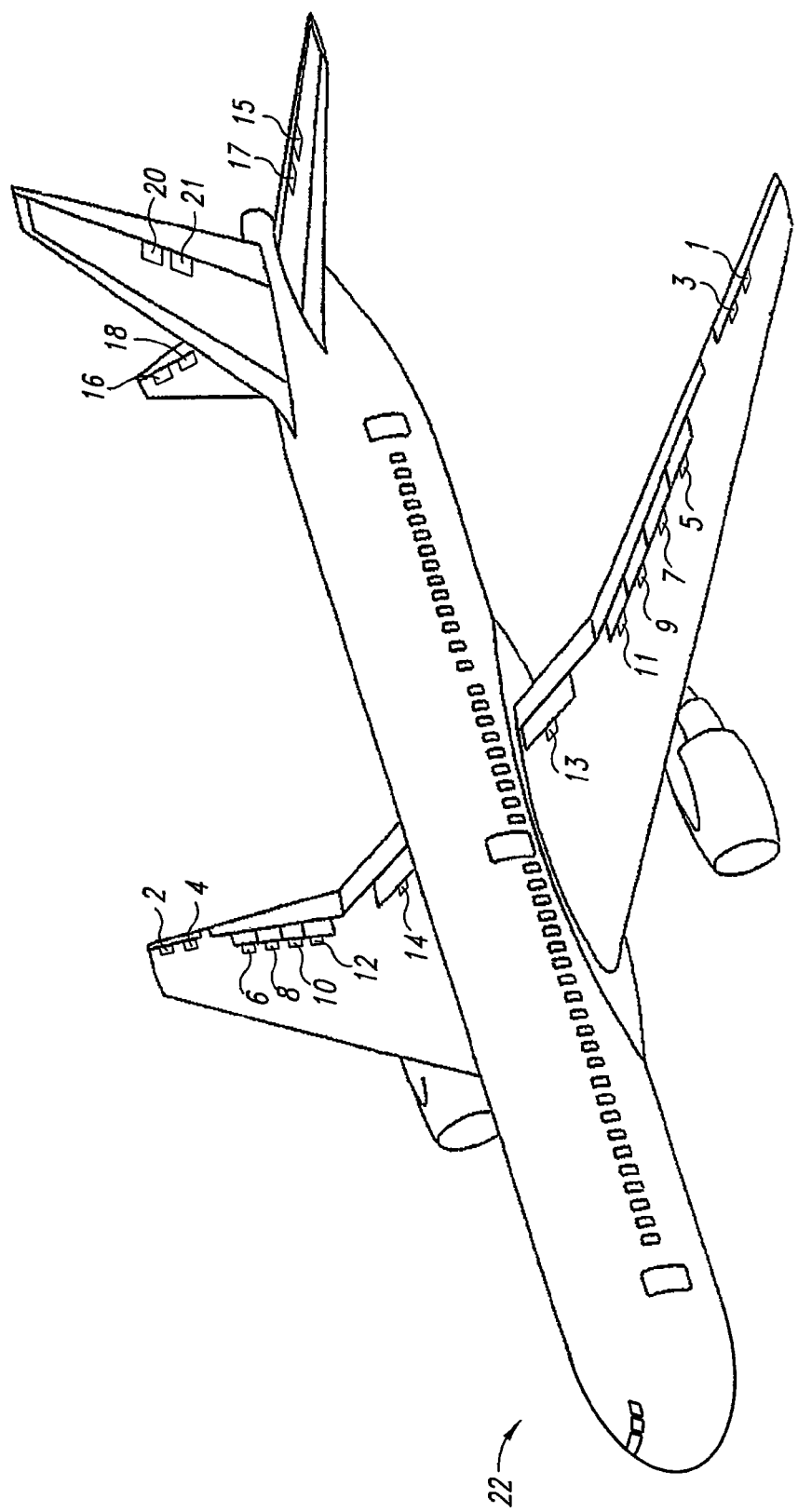
FIG. 1 is a perspective view of an aircraft having the present invention.

FIG. 1 shows an aircraft 22 having flight control surfaces controlled by a local backup hydraulic actuator according to the present invention. The aircraft 22 has a number of flight control surfaces. These include ailerons, spoilers, and, in some cases flaperons on each wing. Typically, these flight control surfaces provide roll, drag, lift, and load control. In addition, the aircraft 22 includes a rudder at a tail section and elevators, also at the empennage, to provide pitch and directional control of the aircraft.

Each of the flight control surfaces has connected thereto one or more hydraulic actuators for causing movement of the flight control surface according to principles of the present invention.

In the example shown, hydraulic actuators 1 and 3 control the aileron on the left wing, while hydraulic actuators 2 and 4 control the aileron on the right wing. Similarly, hydraulic actuators 5, 7, 9, 11, and 13 control the spoilers on the left wing. Similarly, hydraulic actuators 6, 8, 10, 12, and 14 control spoilers on the right wing. Of course, additional hydraulic actuators may be added to control other surfaces, such as flaperon, if present.

Figure 7:
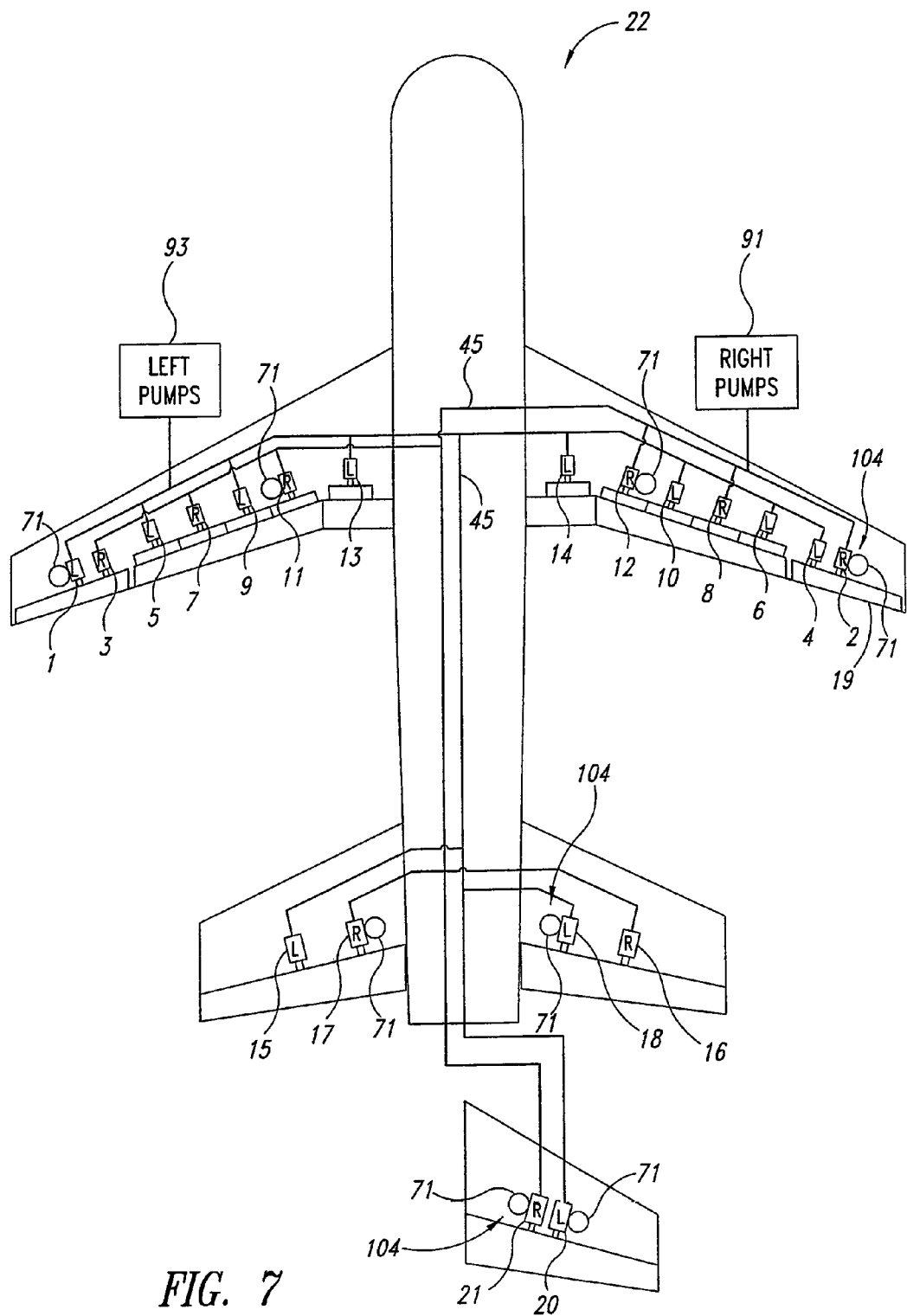
FIG. 7 shows an aircraft having local backup hydraulic actuators according to the invention.

The rudder includes hydraulic actuators 20 and 21 while the elevator includes hydraulic actuators 15 and 17 on the left side and hydraulic actuators 16 and 18 on the right side. The hydraulic control system and hydraulic actuators as shown in FIG. 1 contain, on various ones of the actuators, a local backup system as shown in FIG. 7 and as will described in more detail later herein.

Figure 2:
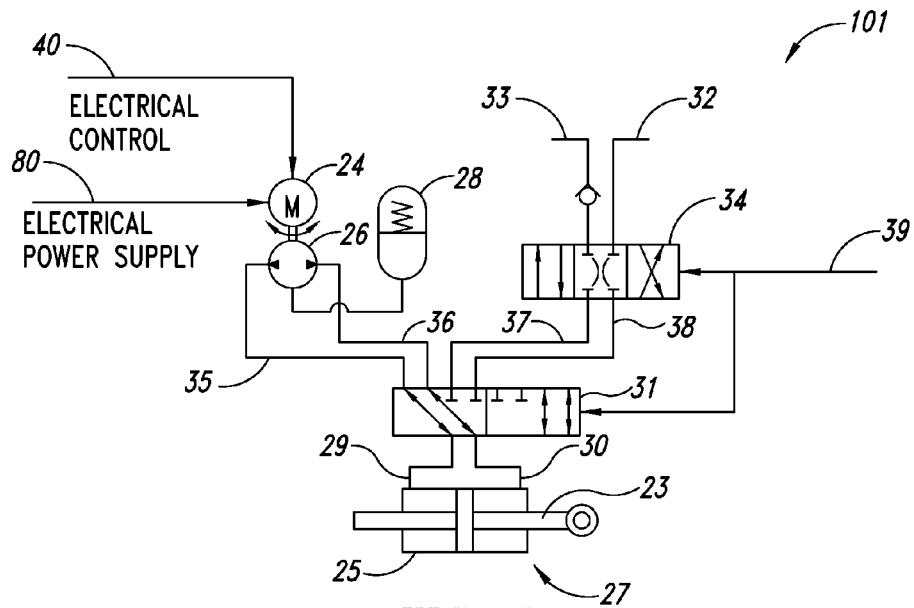
FIG. 2 is a block diagram of a prior art hydraulic actuator system with electrical back up

FIG. 2 shows a simplified schematic of an Electric Backup Hydraulic Actuator (EBHA) 101, a prior art hybrid actuator with an electrical backup system. During normal operation, this system operates as a conventional and widely used hydraulic actuator for fly-by-wire flight controls applications with the switching valve 31 positioned such that lines 37 and 38 are coupled to lines 29 and 30 respectively. An actuator 27 generally includes a cylinder 25 and a piston/rod assembly 23. The piston 23 separates the cylinder 25 into two chambers, one on either side of the piston 23. Each cylinder 25 has ports connected to a hydraulic pressure system. The piston 23 moves or exerts force in one direction when it is pushed that way by the pressure difference between the two chambers on either side of the piston 23. A servo valve 34 is controlled electrically on lines 39 to connect the high-pressure hydraulic fluid, supply 33, to one of the chambers and the low-pressure hydraulic fluid, return 32, to the other chamber. For example, if the servo valve 34 is positioned for the supply of fluid to be connected to the left chamber and the return to the right, then it would result in the piston/rod 23 moving or exerting force to the right. In this way, the position of and the force exerted by the rod end are controlled. The rod end is attached to a flight control surface, such as the elevators of FIG. 1, and the surface is positioned with the movement of the actuator.

When an anomaly affecting normal operation of the actuator is detected, the EBHA engages the backup mode by positioning the switching valve 31 such that lines 35 and 36 are coupled with lines 29 and 30 respectively, as shown in FIG. 2. This disconnects the actuator 27 from the servo valve 34 and couples it to the pump 26. Following this, a signal is sent on line 40 to the motor 24 to actuate the motor using electrical power on line 80. The electric motor 24 rotation causes operation of pump 26. The electrical control signals 40 providing instructions to the motor to cause it to turn in the correct direction to cause pump 26 to provide high pressure on the desired one of the lines 35 and 36. The pump 26 is a two-way pump. When the pump 26 is turned in one direction, the piston/rod 23 of the actuator 27 moves or exerts force in the corresponding direction, and when the pump 26 is turned in the other direction, the piston/rod 23 moves or exerts force in the opposite direction. The pump system therefore connects to the actuator in parallel path to that of the servo valve 34. The moving switching valve 31 permits only one, but not both of the systems to provide high pressure hydraulic fluid to lines 29 and 30.

The servo valve 34 is therefore not used on the backup side since the pump 26, in conjunction with the motor 24, causes the appropriate line to receive pressurized fluid as directed by the electrical controls as seen on line 40. Reservoir 28 is also provided to ensure that the pump 26 has sufficient fluid and they make up for any leakage loss in the local backup hydraulic system.

One difficulty of the prior art electrical backup system 101 is that it is required to be operated in a sequential-power mode. Namely, when hydraulic line 33 is pressurized and providing power to the actuator 27 via the servo valve 34, the motor 24 and pump 26 must be turned off. Upon a failure being sensed, there is some time lag between when the failure occurs and when the motor 24 and pump 26 have been activated to provide sufficient pressure to lines 35 or 36 to move the piston/rod assembly 23 in the desired direction. The electrical system, of motor 24 and pump 26, can only be turned on and connected to the hydraulic actuator 27 after, namely sequentially to, main hydraulic lines 33 and 32 being disconnected. Since the motor 24 cannot operate while the hydraulic portion of the system is operating, some time lag will be present. During critical flight times, such as takeoff and landing, even fractions of a second are important in maintaining control of the flight control surface to which hydraulic actuator 27 is attached.

A further difficulty of the prior art is that, as explained in detail in background of invention, when coupled to a surface in an active-active fashion with another actuator, there is a potential for a substantial increase in force fight compared to having only hydraulic actuators on the surface.

Figure 3:
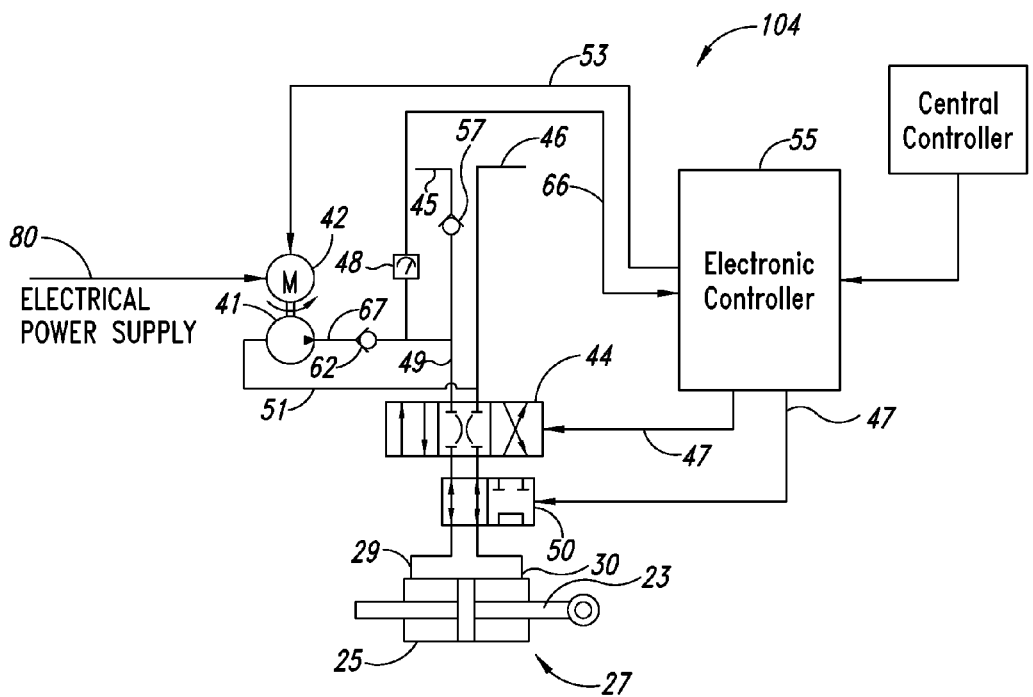
FIG. 3 is a block diagram of local backup hydraulic actuator according to the present invention.

FIG. 3 shows a simplified schematic of a configuration of a local backup hydraulic actuator (LBHA) 104 according to the present invention. The local backup hydraulic actuator 104 is controlled by a local electronic controller 55 and includes a servo valve 44 having an input line 49 and a return line 51 and an electric motor 42 to drive a one-way pump 41. The one-way pump 41 has an output line 67 that is coupled to the supply input line 49 via a check valve 62 and a return line 51 that is coupled to the system return line 46. In the preferred embodiment, it also includes a pressure sensor 48, which senses the pressure at the input hydraulic line 49. The servo valve 44 connects to lines 29 and 30 of the hydraulic actuator 27 to couple the actuator to a source of hydraulic pressure to cause operation of the hydraulic actuator 27 in a well known manner.

A mode select valve 50 is configured to allow the piston/rod assembly 23 to be controlled by pressure from the servo valve 44 during normal operation. When an anomaly affecting the operation of the servo valve is detected, the mode select valve 50 is positioned such that the piston 23 is disconnected from all hydraulic pressure. In this disengaged mode, one option is that the actuator 27 can be placed in dampened movement mode, free movement mode or other mode providing an appropriate level of resistance as is known in the art. Alternatively, according to one embodiment of the invention, the mode select valve 50 includes only two modes of operation, a dampened movement mode and an active mode. This could be used, for example, in the elevator or rudder which have two LBHU's 104 on the same surface, as explained with respect to FIG. 7. Under normal operation, a central hydraulic power system provides pressurized fluid on supply line 45 and low pressure fluid on return line 46. The central hydraulic supply line 45 is coupled to input line 49 of the servo valve 44 via the appropriate supply lines, having a check valve 57 therebetween. The check valve 57 permits full pressure from line 45 to be applied to the servo valve, but in the event the pressure at input line 49 of the servo valve 44 exceeds that on the upstream side of the line 45, check valve 57 prevents fluid and increased pressure from passing back to the central hydraulic system 45.

The pressure sensor 48 senses the pressure on the input line 49 and sends a signal on line 66 indicative of the pressure to the local electronic controller 55. In the event the pressure in the input line 49 falls below a selected threshold, the motor 42 is turned on by a signal on line 53 from the local electronic controller 55. The threshold below which loss of pressure is detected is set in order to support acceptable actuator performance at the time of the failure, while avoiding excessive erroneous detection. Once the failure is detected, the local electronic controller 55 sends signals on line 53 to turn on the motor 42 by drawing power on electric power line 80 and to command the motor 42 to maintain full hydraulic pressure. The output of pump 41 rapidly comes up to pressure, providing full hydraulic pressure on line 67 equal to the desired value. The hydraulic pressure on line 67 is usually set to be equal to the desired value from line 45, so in the event of backup pump 41 is in operation, no change is made at the servo valve 44 and other parts of the system. The pressure sensor 48 output is also used as feedback for control of the pressure on line 49 during backup operation. The servo valve 44 continues to operate in normal fashion under electrical controls 47. The servo valve 44 therefore continues to be positioned to the correct location for moving the rod 23 of hydraulic actuator 27.

The major difficulties of the prior art in electrical and hybrid actuators hitherto described in an active-active fashion is force fight and reliability, and the inventive LBHA 104 has the advantage of being able to resolve both of these difficulties. Even though the LBHA is normally active, the reliability problem is resolved by activating the local power source, consisting of components including the motor 42 and pump 41, only as backup following the failure of the central hydraulic system or during specific phases of flight as will be explained later herein. Therefore, there is much less wear on these components. The force fight problem is resolved also because the actuators and controllers on a surface are identical in each case. The only difference is that after the first hydraulic failure, the source of hydraulic power for the actuator on the failed system switches from the central hydraulics to the local pump 41, which is controlled to maintain the normal supply pressure. Therefore, whether an LBHA is coupled to a surface in parallel with a conventional hydraulic actuator, or two LBHAs are coupled to the same surface, the actuation and controller methods remain essentially identical for all actuators on the surface irrespective of the failure state of one or more of the central hydraulic systems. Therefore, this similarity in actuation and controller methods makes LBHA 104 an ideal choice for either active-active systems or active-standby system. This is another reason that makes extensive LBHA application much more attractive with respect to other types of electrically powered actuators, especially with active-active systems.

The mode of operation thus far explained in which the local motor 42 and pump 41 are activated only when loss of pressure in central supply line 45 or other failure occurs, so that use of the motor 42 and pump 41 is reduced and the life can be extended for long periods of time, is referred to as the sequential-power mode, which is one embodiment of the present invention. One advantage of the present invention is that the local motor 42 and pump 41 may also be operated simultaneously to provide backup pressure in parallel with the central hydraulic pressure. This second mode of operation is referred to as the parallel-power mode. Under normal operations, the LBHA is in the sequential-power mode and the sole pressure source for hydraulic power is on main supply line 45. The operator, or the programmer of the airplane control system, may elect as a safety measure to also have the local pump 41 operational during expected critical times of aircraft operation during which even a temporary reduction in pressure available to actuators may have significant safety impact. This may be, for example, during takeoff and landing or, during other particular flight maneuvers. In the parallel-power mode, the local pump 41 is activated by a command from a central controller (not shown) sent to one or more local electronic controllers 55 even though there is sufficient pressure in the line 45. Input line 49 thus becomes pressurized via line 67 by the local pump 41 as well as being pressurized by the main supply 45. Check valves 62 and 57 ensure that if either one of the systems is slightly different pressure from the other, it does not affect the other system and the line 49 is held at the pressure which is the higher of the two without the pressure being bled off to the other system. Once the critical flight maneuver is completed, the pilot, or the central controller may return the local pump 41 to normal control so that it becomes operational only upon a failure, such as the pressure sensor 48 sending a signal that indicates a drop in pressure in the main supply line 45.

The present invention thus has the advantage that the backup pump 41 may be operated in a parallel-power mode, under selective control of the system or the pilot. While in the parallel-power mode, the failure of either one of the systems alone will not affect the actuator performance because both are fully operational and there is no time lag between a failure of one of the systems and the other system maintaining full pressure. Accordingly, full control of the hydraulic actuator is maintained at all times. The present invention is therefore operational in either the parallel-power mode or in the sequential-power mode. If operated in the parallel-power mode immediate responses are always provided since both systems are fully operational to provide hydraulic pressure to the actuator 27. The amount of time that the system 104 is in the parallel-power mode can be limited to reduce the wear on the motor 42 and pump 41 and extend their operating life.

A further advantage is that pump 41 is a one-way pump. The pump 41 rapidly comes up to pressure to supply an output pressure on line 67. The motor 42 and motor controls need not be structured for changing direction or turning both directions. A further advantage is that complex electronic controls to control the motor 42 and pump 41 are not required since pressure is only being supplied in one direction. The motor 42 and pump 41 do not need to receive electrical control signals to change direction of rotation in order to supply pressure to one side of the hydraulic actuator or to the other. A simple, robust pump 41 can be provided together with the motor 42 which operates in one direction very rapidly to provide the desired pressure. The pump 41, being only a one-way pump is more robust and simpler in operation than the two-way pumps of the prior art. Thus, the life is extended of the overall system even beyond that which would be permitted of the prior art.

Another advantage of the invention over the state of the art is that there is no switching valve 31 to go from the primary mode to the backup mode. The motor 42 and pump 41 are simply activated when the conditions requiring their operation are met. An EBHA system of the prior art requires a switching valve 31, which connects the actuator chambers to either the servo valve 34 or the pump 26.

Figure 4:
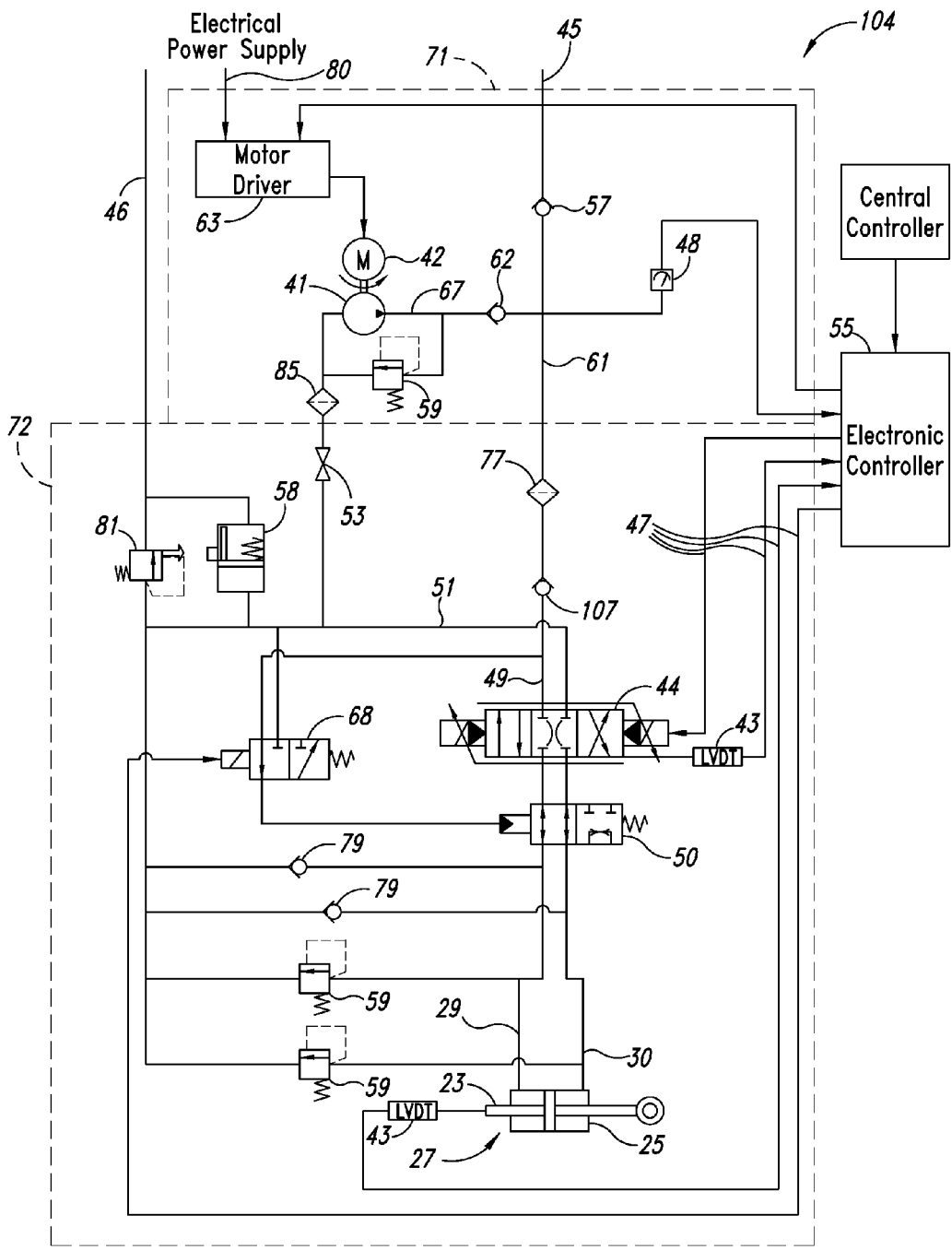
FIG. 4 is a detailed schematic of a local backup hydraulic actuator, powered by a local electric motor and local pump, according to one embodiment of the invention.

FIG. 4 shows a detailed embodiment of a practical application of the inventive local backup hydraulic actuator (LBHA) 104. The LBHA 104 of FIG. 4 operates in a similar manner to that of FIG. 3, however, more details are shown so that the operation in an aircraft environment may be more completely understood. The local backup hydraulic actuator 104 includes a hydraulic actuator 72, and a local pump unit 71, which will now be explained.

As shown in FIG. 4, the position of the actuator 27 and servo valve 44, within the hydraulic actuator system 72, are sensed by the local LVDT systems 43, and signals indicative of their positions are sent back to the local electronic controller 55 through electrical lines 47 in a manner well known in the art. Subsequently, electronic signals on lines 47 from the local electronic controller 55 provide signals to control the various valves in the system. For example, the local electronic controller 55 regulates the position of the solenoid valve 68, which in turn affects the pilot pressure to the mode select valve 50, and thus, its position, as is known in the art.

The servo valve 44 is controlled in a manner well known in the art, so the details are not shown, rather it is shown schematically with its position being indicated as controlled by the local electronic controller 55 even though some other control mechanizing may be used. In addition, relief valves 59, with or without manual releases are provided at various parts throughout the system. The return line 51 from the servo valve is coupled to a compensator 58 of a standard type having a sight glass and other features. Other components which are standard for hydraulic actuators such as check valves 79 and other standard components, not shown, may also be present. An additional isolation valve, not shown, may also be present in the return line in addition to a relief valve 81. Filters 77 and 85 may also be provided in the system. A check valve 107 may also be provided for uniformity of components so that the same hydraulic actuator may be used even when an LBHA is not present, as discussed later herein.

The local pump unit (LPU) 71 has a motor driver 63, a motor 42, a pump 41, a filter 85, a relief valve 59, and check valves 62 and 57. There is also a pressure sensor 48 coupled to a line 61 that is downstream from the supply line 45. This pressure sensor 48 is not present in all embodiments, as will be explained later herein. The relief valve 59 in the LPU 71 is configured to protect the actuator 72 from over pressure, which may occur due to a failure resulting in excessive electrical power being applied to the motor 42.

During normal operation, the motor 42 and pump 41 are turned off, and the high pressure fluid is provided to the servo valve 44 exclusively from the supply line 45. The pump 41 remains isolated from the high-pressure hydraulic fluid supply line 45 by the LPU 71 check valve 62. If the central hydraulic system has a pressure loss failure, such as from central pump failure or fluid loss from the system, the supply pressure on line 45 drops, reducing the pressure on line 61, and this is detected by the local electronic controller 55 observing the signal from pressure sensor 48. When failure is detected, the local electronic controller 55 turns on the electric motor 42 through the motor driver 63 and controls the electrical power to the motor such that the pressure reading from the sensor 48 is maintained at the normal level.

One of the ways in which the central hydraulic system could fail is through loss of hydraulic fluid. In one case, the fluid could exit the system from the return line 46 as well as the supply line 45. Fluid is prevented from flowing out of the supply line 45 by the check valve 57. To keep the actuator 72 operational with the LPU 71, it is necessary to prevent the loss of fluid from the LBHA through the return line 46 as well. This is accomplished by the relief valve 81, which acts as an isolation valve; an additional isolation valve can also be provided if desired, for example, one similar in operation to valve 50. In addition, the compensator 58 maintains a reserve of fluid to compensate for leakage until the aircraft lands and repairs can be made, and thus ensures that fluid is maintained in the LBHA 104 even when there is no fluid in the central hydraulic system.

The loss of pressure in central system line 45 can also be detected by monitoring the output of different sensors at a central location. In some cases, the central controller (not shown) may detect the failure in this way and issue a local pump activation command to the local electronic controllers 55 of the LBHAs which receive primary hydraulic power from the failed central hydraulic system.

Local failure detection can alternatively be accomplished by monitoring the electronic feedback on electrical lines 47. If the hydraulic actuator 27 or the servo valve 44 are not moving to the position they have been commanded to move to, this failure is detected by monitoring the position signals from the LVDTs 43 coupled to them. Upon detection of failure in this way, the local electronic controller 55 would trigger a failure signal and activate the local pump 41 by turning on the motor 42. The position of the actuator 27 and/or servo valve 44 can continue to be monitored to determine if they have now moved to the commanded position, if so, the backup system 71 can continue to operate. If not, the mode select valve 50 may be moved such that the actuator 27 is disconnected from the servo valve 44 in this situation. Thus, a failure that activates the local pump 41 can be detected many ways, without pressure sensor 48 and even beyond those discussed herein.

The motor control scheme of motor 42 also has a number of options which are possible. According to preferred baseline control scheme, the motor would be controlled to maintain the pressure at the local hydraulic line 49 at the same pressure as normal as if receiving high pressure from the supply line 45. This can be accomplished with a closed-loop control with absolute pressure feedback from sensor 48 to local electronic controller 55. While this is the preferred baseline scheme, other types of control systems are also possible. As an alternative, a different closed-loop control with position feedback may be used. In such a situation, power applied to the electric motor 42 is regulated as a function of the difference between the position command and the actual position. Power is provided only as necessary in order to position the piston in the desired position. As a further alternative, a control scheme may be closed-loop with both position and pressure sensor feedback. The difference between the position command and the actual position is used in combination with pressure control. Furthermore, instead of electrical control such as those described thus far, a purely or partially mechanical means of regulating or limiting the pressure may also be used in a manner well known in the art. Thus, the motor can be controlled in many ways, even beyond those discussed herein. Furthermore, if monitoring and control schemes, neither of which requires the local pressure information, are selected, then the pressure sensor 48 may be eliminated from the LPU 71.

Finally, the LPU 71 may or may not be physically attached to the actuator 72. It may be beneficial in some cases to place it away from the actuator 72 and connect them by hydraulic tubes. There are also various options with respect to the location of the local electronic controller 55 as well as packaging of the various functions implemented by this controller 55. The local electronic controller 55 may, for example, be placed on or in close proximity to either the actuator 72 or the LPU 71 or remotely in some central location. The various functions implemented by this local electronic controller 55, such as control and monitor functions of actuator 72 and control and monitor functions of the LPU 71, may be packaged together or separately and placed in different locations depending on other design constraints.

Figure 5:
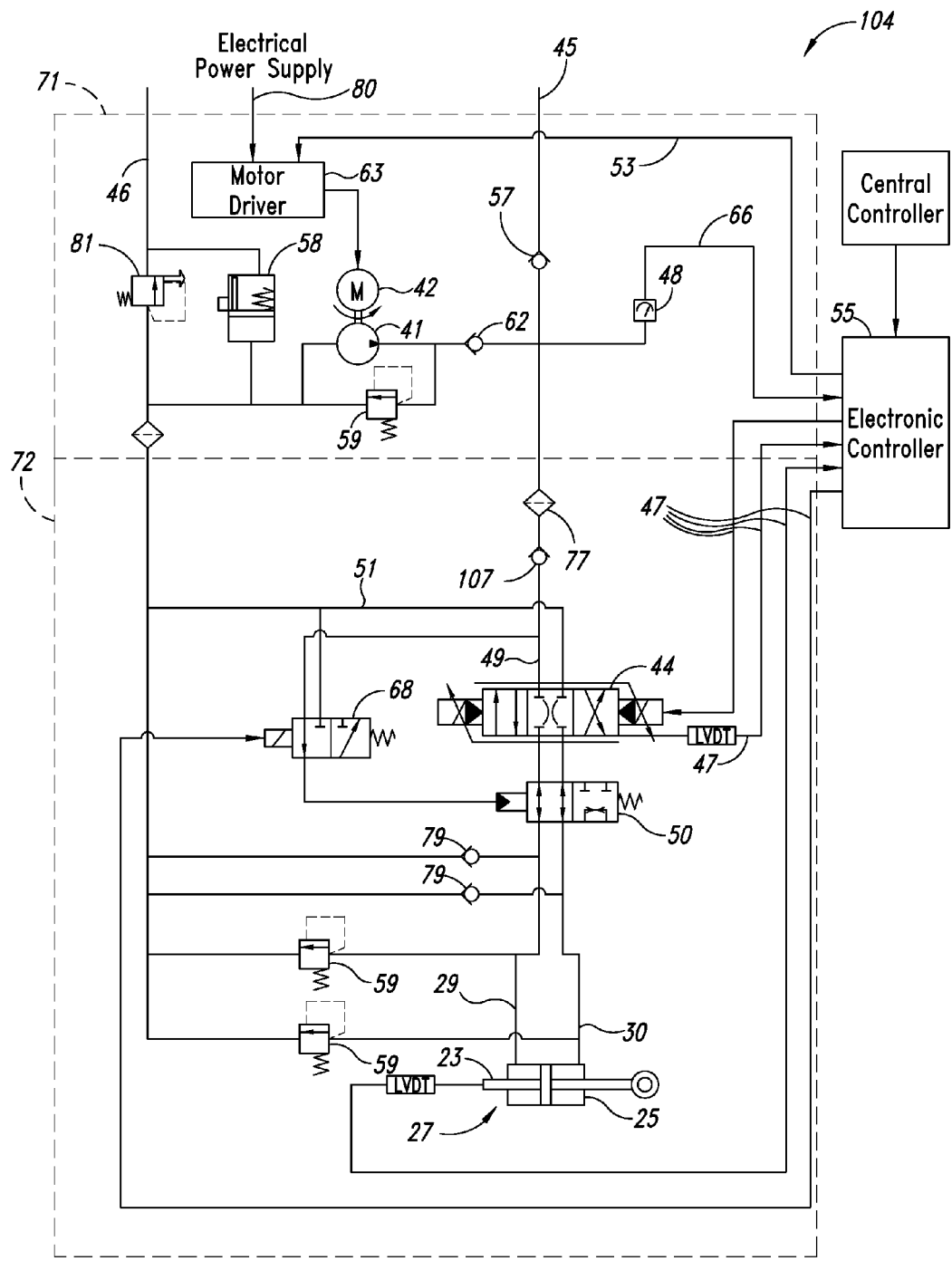
FIG. 5 is a detailed schematic of a local backup hydraulic actuator, powered by a local electric motor and local pump, according to a second embodiment of the invention.

FIG. 5 shows another embodiment of the invention. Here, the compensator 58 and relief valve 81 are not present in the actuator 72, but are within the LPU 71. The compensator 58 is sometimes not necessary in a hydraulic actuator. By configuring the LPU 71 in this manner and using the same actuator 72 at different locations throughout the aircraft the number of compensators 58 and relief valves 81 in a system can be reduced. The operation of the embodiment of FIG. 5 can be understood from that of FIG. 4, so the details are not repeated.

Figure 6:
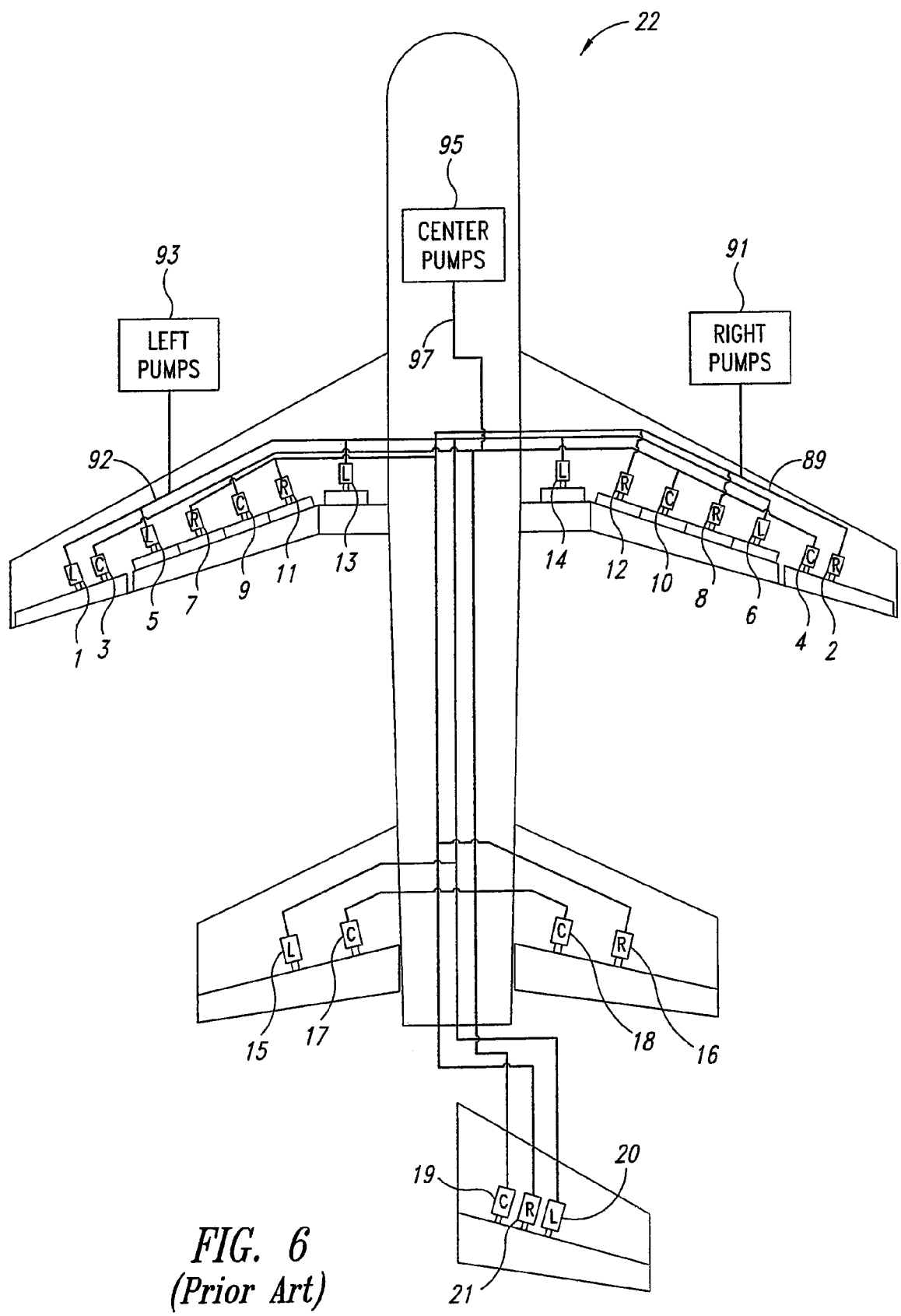
FIG. 6 shows an aircraft having prior art hydraulic systems.

FIG. 6 shows an aircraft 22 having conventional redundant hydraulic systems as is known in the prior art and a typical configuration is described with respect to FIG. 6. In this prior art system, the aircraft 22 has three independent central hydraulic systems, which in this case is referred to as Left, Right, and Center. They could also be labeled systems 1, 2 and 3, etc. All three central systems are functioning during normal operation. Each system is pressurized by hydraulic pumps located centrally in the aircraft 22. The Left system may have one pump 93 driven by the left engine and another pump 93 by an electrical motor, the Right system may have one pump 91 driven by the right engine and the other pump 91 by an electrical motor, and the Center system may have both pumps 95 driven by electrical motors. The pressurized fluid from Left pumps 93 is carried through line 92 and distributed to actuators designated with the letter L. The pressurized fluid from Right pumps 91 is carried through line 89 and distributed to actuators designated with the letter R. The pressurized fluid from Center pumps 95 is carried through line 97 and distributed to actuators designated with the letter C. As shown in FIG. 6, the various actuators have the same reference numbers as previously referred to with respect to FIG. 1. The distribution of the actuators powered by each central hydraulic system is determined in order to ensure sufficient control of the airplane to support continued safe flight and landing following the failure of any two central hydraulic systems. The likelihood of failure of all three central hydraulic systems, and thus, a complete loss of actuation power to flight control actuators is considered negligible.

FIG. 7 shows a typical backup system according to principles of the present invention. In this system, the aircraft 22 has two independent central hydraulic systems, which in this case are referred to as Left and Right systems, but could also be called first and second, etc. Each system is pressurized by hydraulic pumps located centrally in the aircraft 22 in a similar manner to aircraft 22 in FIG. 6. All of the actuators receive hydraulic power from either the Left or Right system. The actuators receiving hydraulic power from the Left system are designated with the letter L, and the actuators receiving hydraulic power from the Right system are designated with the letter R. In this aircraft system, some, or all of the hydraulic actuators have an LPU 71 connected thereto. The example in FIG. 7 shows an aircraft 22 having both actuators on the rudder, one actuator on each of the elevators and ailerons, and one actuator on a spoiler on each wing having an LPU 71 connected thereon. Of course, an LPU 71 can be provided on more or fewer hydraulic actuators 72, depending on the design choice.

The LPU 71 corresponds to the local pump unit shown in FIGS. 4 and 5 and described previously. The LPU 71 is provided with an electrical power supply via an electrical power distribution network, not shown. Because of this, an LBHA 104 is functional following the failure of the hydraulic system that provides the primary source of hydraulic power. Therefore, by providing an LPU 71 to appropriate actuators, it can be ensured that sufficient surfaces are controllable following the loss of both central hydraulic systems, without a third system being necessary.

With the hydraulic actuator system of the prior art, there needs to be three actuators 19, 20, 21 on the rudder to ensure that it can be controlled following the loss of two of the hydraulic systems, which is conceivable. By employing at least one LBHA 104 for the rudder, it becomes possible to reduce the number of actuators on the rudder from three as shown in FIG. 6 to two as shown in FIG. 7. This is because having one LBHA 104 and a standard hydraulic actuator in parallel on a surface is sufficient to ensure that the surface is controllable following any conceivable failures in the actuators and power sources. FIG. 7 shows both rudder actuators to be LBHAs 104. This configuration is beneficial because required takeoff distance is often influenced by how fast the rudder can be deflect following the failure of one engine causing thrust asymmetry and the hydraulic system associated with the engine. If one of the rudder actuators is purely hydraulic and if the engine that the hydraulic system is associated with fails, it needs to be assumed that the actuator no longer is functional. Therefore, the rudder needs to be deflected quickly enough to counteract thrust asymmetry with just one active actuator, while the non-functional actuator typically needs to be configured to provide minimum resistance. If both are LBHAs 104, as shown in FIG. 7, then they can both be assumed to be available to deflect the surface in this event, and thus, potentially leading to smaller, lighter, and simpler individual actuators. Currently, it is thought that having two LBHAs 104 on the rudder would be preferable, but embodiments having only one are possible and the choice would typically depend on cost, weight, and reliability.

The two modes of operation that have been discussed herein, namely parallel and sequential power modes, can also be use in conjunction. Following the failure of a particular hydraulic system, the local electronic controller 55 of LBHA 104 whose primary power source has failed would detect the failure and turn on the backup motor 42 and control it to maintain normal pressure as already described. At the same time, the central controller for the entire aircraft (not shown) which gathers the status of each actuator 104 from each local electronic controller 55, along with other airplane information, determines that one system of the aircraft hydraulic systems has failed, and upon detection, it commands all of the LBHAs 104 to engage their backup systems 71, which result in some of the LBHAs being in the parallel-power mode. In this manner, it is possible to ensure that none of the LBHAs 104 experiences any upset following the possible failure of second central hydraulic system. For example, following the failure of the Right system, the LPU 71 on actuators 2, 11, 12, 17, and 21 are turned on immediately by each local controller 55. Shortly following this, the central controller commands the local electronic controllers 55 on actuators 1, 4, 18, and 20 to turn on the local motor 42 and pump 41 so that all of the LBHAs 104 can be fully functional if there is a subsequent failure of the Left system. Therefore, this allows the use of the backup components to be minimized while at the same time ensures that all of the LBHAs are operational with full pressure in the event of this sequential failure case.

Figure 8:
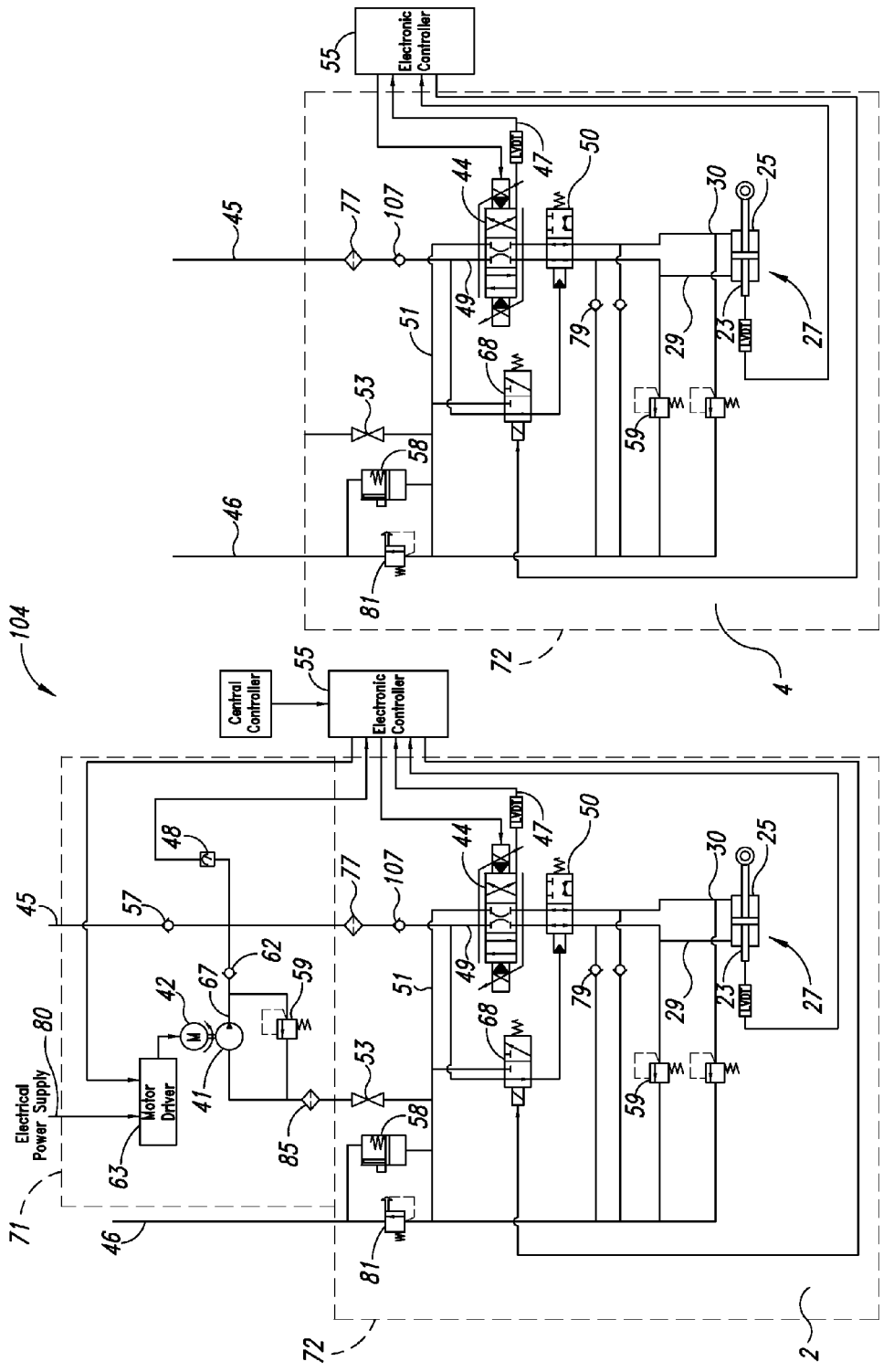
FIG. 8 is a schematic of an alternative embodiment of two hydraulic actuators on the same flight control surface, one having a local backup pump according to the invention and the other being powered solely from a central hydraulic system.

FIG. 8 is an embodiment in which two actuators are side by side on the same flight control surface, only one of which has an LPU 71. This may be on the elevator, the spoilers or the aileron 19, as shown in FIG. 7. The actuator 72 may be a conventional hydraulic actuator of a type well known in the art. In the example shown in FIG. 7, a standard hydraulic actuator 4 is on the same flight control surface 19 as an LBHA 104. Though of course, other control surfaces may have side-by-side hydraulic actuators connected as shown in FIG. 8. In the example shown, a standard hydraulic actuator 4 is powered by a central hydraulic system. It is constructed as a standard hydraulic actuator having all the components as known in the prior art and a local electronic controller 55 which functions according to known methods in the art. Coupled to the same flight control surface, and spaced closely thereto is an inventive LBHA 104. The LBHA 104 is coupled to a different central hydraulic control system and the electrical system. Therefore, two central hydraulic systems and electrical backup power, and thus, three independent sources of power are available for actuating the surface. The surface, therefore, remains functional following the failure of any two. This provides an additional level of safety not provided in the prior art with two hydraulic actuators or one hydraulic actuator and a purely electric actuator, such as an EHA. The probability of failure of the servo valve or components used for its control is sufficiently low such that the likelihood of their failure in two actuators coupled to the same surface or failure in one combined with the failure of the central hydraulic system associated with the other can be shown to be negligible. Therefore, it is possible to have a design that provides backup for the system using the same servo control function within each actuator. Providing a backup hydraulic pressure in the event of loss of central hydraulic pressure is the backup system that is preferred.

A further advantage is that the hydraulic actuator 4 is identical to the component 72, which is the hydraulic actuator portion of the inventive LBHA 104. When the LPU 71 is connected to the actuator 72, the shutoff valve 53 is opened, and when it is not connect, this valve 53 is closed. This feature would allow the identical actuator 72 of LBHA 104 to be used as a conventional hydraulic actuator. This is useful for surfaces with multiple actuators because there is often no need to use LBHA 104 for all the actuators on the same control surface. Being able to use the same actuator 72 for both LBHA and conventional hydraulic actuator is often economically desirable. By having the hydraulic actuator portion identical, the LPU 71 can be easily connected to either one of the systems and economies of scale can be achieved by making each local hydraulic actuator 72 exactly the same. Furthermore, the embodiment shown in FIG. 5 would allow the actuator portion 72 to be used independently without the need for the shutoff valve 53. Of course, for certain applications with different design objectives, it may be desirable to eliminate the components superfluous to the operation of the system at the cost of not being able to use the actuator portion 72 independently as a conventional hydraulic actuator.

Figure 9:
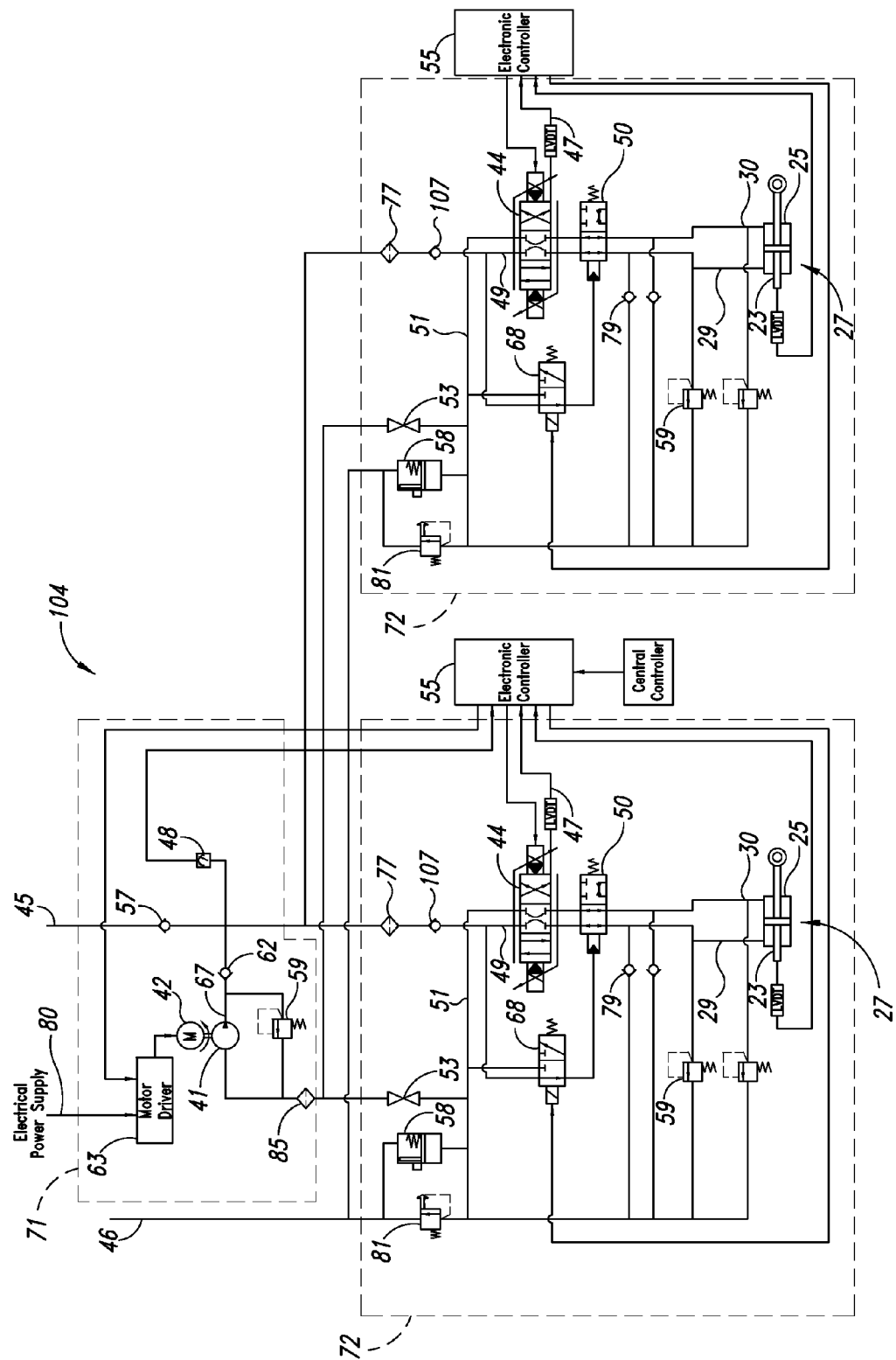
FIG. 9 is a schematic of an alternative embodiment of two hydraulic actuators being coupled to the same local pump unit.

Another advantage of the invention over the state of the art is that an LPU 71 locally coupled to an actuator 72 may also be connected in parallel to a second actuator, some distance from the LPU 71. FIG. 9 is an example of a single LPU 71 providing a backup hydraulic pressure to two different hydraulic actuators 72. According to the embodiment FIG. 9, two hydraulic actuators 72 are coupled to the same central hydraulic system. This may be, for example hydraulic actuators 21 and 17 of FIG. 7. Both of these hydraulic actuators are coupled to the Right central hydraulic system and therefore share a common pressure line 45 and common return line 46. This is schematically shown in FIG. 9 in which both of the hydraulic actuators receive hydraulic pressure from a common supply line 45. Of course, the actual tubing and hydraulic connections may be slightly different, FIG. 9 being a schematic representation.

In this embodiment, since both of the hydraulic actuators 72 are coupled to the same central system, the LPU 71 may have additional tubing connected in order to provide backup hydraulic pressure to both of the actuators 72. In the event of loss of this central pressure system providing pressure on line 45, the local electronic controller 55 activates the pump 41 based on the signal from the pressure sensor 48, the command from the central controller, or some other source that has been discussed herein. A control signal is sent to motor driver 63, which activates motor 42 to turn on pump 41 and provide high pressure hydraulic fluid on output line 67. The output line of 67 is coupled to both hydraulic actuators 72 so that sufficient hydraulic pressure is provided to both actuators. The embodiment of FIG. 9 may be advantageous to use in various locations, such as in the wings, for sharing between a spoiler and aileron or in the tail section for sharing between a rudder and an elevator. The motor 42 and pump 41 may be made slightly larger in order to provide hydraulic pressure to multiple hydraulic actuators 72, but, some weight and cost savings may be realized by having only one LPU 71 for multiple actuators.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A hydraulic control system, comprising:
   a hydraulic actuator having a cylinder and piston assembly;
   a first and second fluid line coupled to the hydraulic actuator;

a high pressure fluid line;

a low pressure fluid line;

a central pressure source coupled to the high pressure fluid line to place high pressure on the first and second fluid lines;

a servo valve positioned between the central pressure source and the hydraulic actuator and being controllable to selectively connect the first and second fluid lines to the high pressure fluid line and the low pressure fluid line to control movement of the hydraulic actuator; a pressure sensor adjacent the servo valve and coupled to the high pressure fluid line to sense the pressure in the high pressure fluid line adjacent the servo valve, upstream of the servo valve, the pressure sensor outputting a signal indicative of the pressure in the high pressure fluid line;

a local pump adjacent to the servo valve, the local pump being coupled to the high pressure fluid line upstream of the servo valve to increase the local pressure in the high pressure fluid line upon being actuated;

an electric motor coupled to the local pump to actuate the local pump;

a first check valve in the high pressure fluid line adjacent the servo valve, the first check valve preventing the high pressure fluid from entering from the local pump to the central pressure source;

a second check valve adjacent to the local pump, the second check valve preventing the high pressure fluid from entering from the central pressure source to the local pump; and a controller which performs (i) a sequential-power mode in which, when a signal output from the pressure sensor is indicative of a pressure lower than a selected value, pressure supply to the hydraulic fluid line is maintained by placing pressure from the local pump to the high pressure fluid line by activating the electric motor and (ii) a parallel-power mode in which, when it is required to switch the pressure source quicker than in the sequential-power mode, the electric motor is activated in advance for a failure of the central pressure source so that the pressure from the central pressure source and the pressure from the local pump are simultaneously supplied to the high pressure fluid liner, wherein, the controller includes:

a central controller which outputs a signal based on whether the sequential-power mode is activated and whether the parallel-power mode is activated; and a local controller which activates or stops the electric motor when receiving the signal from the central controller.

2. The hydraulic control system of claim 1 wherein said local pump comprises a one-way pump.

3. The hydraulic control system of claim 2 wherein said servo valve is configured such that movement towards a first position engages said cylinder and piston assembly to extend when provided a high pressure fluid; and movement toward a second position engages said cylinder and piston assembly to retract when provided a high pressure fluid.

4. The hydraulic control system of claim 1 further comprising a relief valve coupled to an input port of said local pump and output port of said local pump.

5. The hydraulic control system of claim 1 further comprising an isolation valve positioned between the low pressure fluid line and the local pump.

6. The hydraulic control system of claim 1 further comprising:

as the central pressure source, first and second central pressure sources having independent fluid paths from each other.

7. A hydraulic control system for an aircraft, comprising:

a plurality of actuator assemblies within said aircraft, each actuator assembly including a hydraulic actuator and a cylinder/piston assembly, and generally adjacent an aircraft control surface to be controlled by said cylinder/piston assembly;

a local pump configured to provide fluid under high pressure to a first one of said actuator assemblies;

a motor for driving the local pump upon receiving an activation signal;

a central pressure source providing fluid under high pressure to said first actuator assembly;

a pressure sensor coupled to the central pressure source for detecting a reduction in operational fluid pressure provided from said central pressure source and generating a low pressure indication signal when the pressure in the central pressure source is lower than a threshold amount;

a servo valve for selecting a direction of operation of said cylinder/piston assembly, said electric servo valve being connectable to receive fluid under pressure from said local pump and from the central pressure source;

a first check valve provided between the local pump and the central pressure source, the first check valve preventing the high pressure fluid from entering from the local pump to the central pressure source;

a second check valve provided between the local pump and the central pressure source, the second check valve preventing the high pressure fluid from entering from the central pressure source to the local pump; and a controller which performs (i) a sequential-power mode in which, when the low pressure indication signal generated by the pressure sensor is received, supply of the pressure fluid to the servo valve is maintained by supplying the pressure fluid from the local pump to the servo valve by sending the activation signal to the motor and (ii) a parallel-power mode in which, when it is required to switch the source of the pressure fluid quicker than in the sequential-power mode, the activation signal is sent to the motor in advance for a failure of the central pressure source so that the pressure fluid from the central pressure source and the pressure fluid from the local pump are simultaneously supplied to the servo valve, wherein, the controller includes:

a central controller which outputs a signal based on whether the sequential-power mode is activated and whether the parallel-power mode is activated; and a local controller which activates or stops the motor when receiving the signal from the central controller.

8. The hydraulic control system of claim 7 wherein the pressure sensor for detecting a reduction in operational fluid pressure is located adjacent to said first hydraulic actuator assembly.

9. A local pump unit for controlling a hydraulic actuator, said local pump unit comprising:

an electric motor;

a one-way pump powered by said electric motor to provide a high pressure fluid output to the hydraulic actuator via a servo valve;

a pressure sensor for outputting a signal indicative of a low pressure when a pressure of the central pressure source supplying the high pressure fluid output to the hydraulic actuator via the servo valve is below a selected value;

a first check valve provided between the one-way pump and the central pressure source, the first check valve preventing the high pressure fluid from entering from the one-way pump to the central pressure source; and a second check valve provided between the one-way pump and the central pressure source, the second check valve preventing the high pressure fluid from entering from the central pressure source to the one-way pump, the electric motor being connected to a controller which performs (i) a sequential-power mode in which, when the signal is received from the pressure sensor, supply of the high pressure fluid output to the hydraulic actuator is maintained by supplying the high pressure fluid output from the one-way pump to the hydraulic actuator by activating the electric motor and (ii) a parallel-power mode in which, when it is required to switch the source of the high pressure fluid output quicker than in the sequential-power mode, the electric motor is activated in advance for a failure of the central pressure source so that the high pressure fluid output from the central pressure source and the high pressure fluid output from the one-way pump are simultaneously supplied to the hydraulic actuator, and the controller including:
a central controller which outputs a signal based on whether the sequential-power mode is activated and whether the parallel-power mode is activated; and
a local controller which activates or stops the electric motor when receiving the signal from the central controller.

10. The local pump unit of claim 9 wherein the pressure sensor detects an actual local pressure of the central pressure source adjacent to the hydraulic actuator and outputs a signal indicative of a value of the actual local pressure.

11. The local pump unit of claim 9 wherein the pressure sensor outputs the signal indicative of a low pressure when the pressure of the central pressure source adjacent to the hydraulic actuator is below a selected value.

12. A method for operating a hydraulic actuator that receives fluid pressure from a central pressure source, the method comprising:
sensing with a sensor a condition that calls for supply of fluid pressure from a local pump to the hydraulic actuator that receives fluid pressure from the central pressure source, the sensing the condition including sensing whether a servo valve is not moving correctly;
outputting a signal from the sensor in response to the sensor having sensed the condition that calls for the supply of fluid pressure from the local pump;
activating the local pump adjacent to said hydraulic actuator and coupled upstream of the servo valve, on a high pressure fluid line, to perform a sequential-power mode in which, when the signal is received from the sensor, supply of the fluid pressure to the hydraulic actuator is maintained by supplying the fluid pressure from the local pump to the hydraulic actuator;
activating the local pump to perform a parallel-power mode in which, when it is necessary to switch the source of the fluid pressure quicker than in the sequential-power mode, the fluid pressure from the central pressure source and the fluid pressure from the local pump are simultaneously supplied to the hydraulic actuator in advance for a failure of the central pressure source;
providing increased fluid pressure to the high pressure fluid line adjacent to the hydraulic actuator, while preventing the fluid pressure of the local pump from entering the central pressure source by a first check valve and preventing the fluid pressure of the central pressure source from entering the local pump by a second check valve;
moving the servo valve in a first direction to provide high pressure fluid to a first side of the hydraulic actuator; and
moving the servo valve in a second direction to provide high pressure fluid to a second side of the hydraulic actuator.

13. The method for operating the hydraulic actuator of claim 12, wherein sensing with a sensor a condition comprises:
sensing whether the hydraulic actuator is not moving correctly.

14. The method for operating the hydraulic actuator of claim 12, wherein sensing a condition comprises:
sensing a decrease in pressure in the central pressure source adjacent to the hydraulic actuator.

15. A hydraulic control system, comprising:
a hydraulic actuator having a cylinder and piston assembly;
a first and second fluid line coupled to the hydraulic actuator;
a high pressure fluid line;
a low pressure fluid line;
a central pressure source coupled to the high pressure fluid line to place high pressure on the first and second fluid lines;
a servo valve positioned between the central pressure source and the hydraulic actuator and being controllable to selectively connect the first and second fluid lines to the high pressure fluid line and the low pressure fluid line to control movement of the hydraulic actuator;
a local pump adjacent to the servo valve, the local pump being coupled to the high pressure fluid line upstream of the servo valve to increase the local pressure in the high pressure fluid line upon being actuated;
an electric motor coupled to the local pump to actuate the local pump;
a sensor sensing a condition that calls for supply of fluid pressure from the local pump to the high pressure fluid line and outputting a signal, the sensor sensing whether the hydraulic actuator is not moving correctly;
a first check valve in the high pressure fluid line adjacent the servo valve, the first check valve preventing the high pressure fluid from entering from the local pump to the central pressure source;
a second check valve adjacent to the local pump, the second check valve preventing the high pressure fluid from entering from the central pressure source to the local pump; and
a controller which performs (i) a sequential-power mode in which, when the signal is received from the sensor, supply of the pressure to the hydraulic fluid line is maintained by placing pressure from the local pump to the high pressure fluid line by activating the electric motor and (ii) a parallel-power mode in which, when it is required to switch the pressure source quicker than in the sequential-power mode, the electric motor is activated in advance for a failure of the central pressure source so that the pressure from the central pressure source and the pressure from the local pump are simultaneously supplied to the high pressure fluid line.

16. The hydraulic control system of claim 15, wherein the sensor senses whether the servo valve is not moving correctly.

17. A hydraulic control system for an aircraft, comprising:
a plurality of actuator assemblies within said aircraft, each actuator assembly including a hydraulic actuator and a cylinder/piston assembly, and generally adjacent an aircraft control surface to be controlled by said cylinder/piston assembly;

a local pump configured to provide fluid under high pressure to a first one of said actuator assemblies;

a motor for driving the local pump upon receiving an activation signal;

a central pressure source providing fluid under high pressure to said first actuator assembly;

a servo valve for selecting a direction of operation of said cylinder/piston assembly, said electric servo valve being connectable to receive fluid under pressure from said local pump and from the central pressure source;

a sensor sensing a condition that calls for supply of the fluid pressure from the local pump to the servo valve and outputting a signal, the sensor sensing whether the hydraulic actuator is not moving correctly;

a first check valve provided between the local pump and the central pressure source, the first check valve preventing the high pressure fluid from entering from the local pump to the central pressure source;

a second check valve provided between the local pump and the central pressure source, the second check valve preventing the high pressure fluid from entering from the central pressure source to the local pump; and a controller which performs (i) a sequential-power mode in which, when the signal is received from the sensor, supply of the pressure fluid to the servo valve is maintained by supplying the pressure fluid from the local pump to the servo valve by sending the activation signal to the motor and (ii) a parallel-power mode in which, when it is required to switch the source of the pressure fluid quicker than in the sequential-power mode, the activation signal is sent to the motor in advance for a failure of the central pressure source so that the pressure fluid from the central pressure source and the pressure fluid from the local pump are simultaneously supplied to the servo valve.

18. The hydraulic control system of claim 17, wherein the sensor senses whether the servo valve is not moving correctly.

19. A local pump unit for controlling a hydraulic actuator, said local pump unit comprising:

an electric motor;

a one-way pump powered by said electric motor to provide a high pressure fluid output to the hydraulic actuator via a servo valve;

a first check valve provided between the one-way pump and the central pressure source supplying the high pressure fluid output to the hydraulic actuator via the servo valve, the first check valve preventing the high pressure fluid from entering from the one-way pump to the central pressure source; and a second check valve provided between the one-way pump and the central pressure source, the second check valve preventing the high pressure fluid from entering from the central pressure source to the one-way pump, the electric motor being connected to a controller which performs (i) a sequential-power mode in which, when a signal is supplied from a sensor sensing a condition that calls for supply of the high pressure fluid output from the one-way pump to the hydraulic actuator, supply of the high pressure fluid output to the hydraulic actuator is maintained by supplying the high pressure fluid output from the one-way pump to the hydraulic actuator by activating the electric motor and (ii) a parallel-power mode in which, when it is required to switch the source of the high pressure fluid output quicker than in the sequential-power mode, the electric motor is activated in advance for a failure of the central pressure source so that the high pressure fluid output from the central pressure source and the high pressure fluid output from the one-way pump are simultaneously supplied to the hydraulic actuator, and the sensor sensing whether the hydraulic actuator is not moving correctly.

20. The local pump unit of claim 19, wherein the sensor senses whether the servo valve is not moving correctly.

* * * * *